April 7, 1970     D. W. REES     3,505,465
PANORAMIC TELEVISION VIEWING SYSTEM
Filed April 21, 1967     3 Sheets-Sheet 2
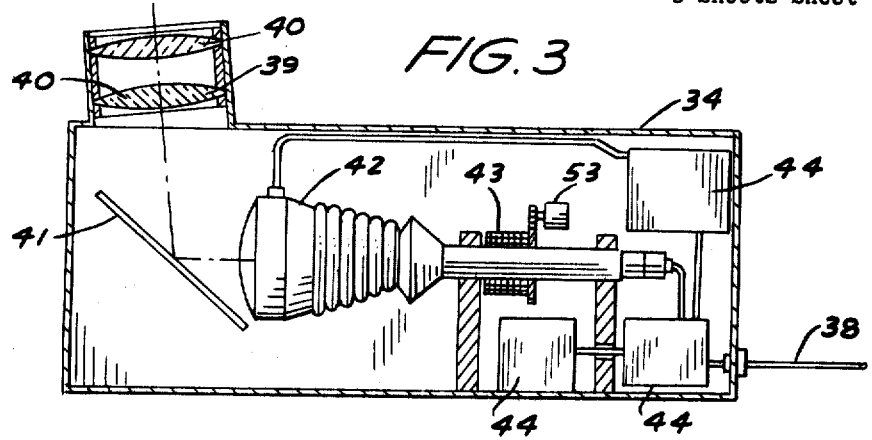
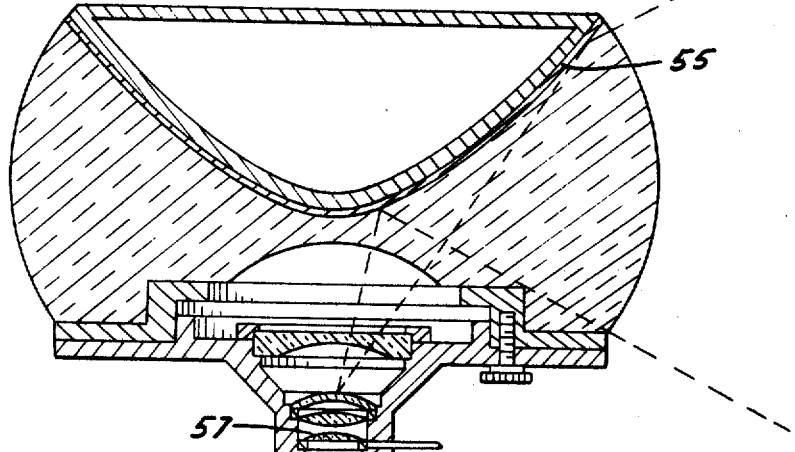
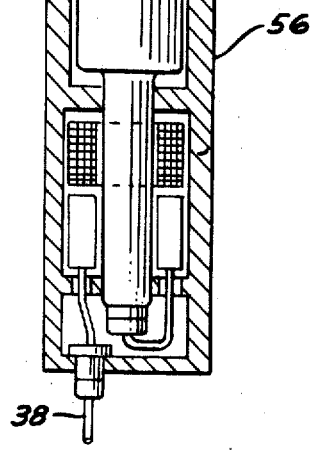
DONALD W. REES
INVENTOR.
BY H. M. Saragovitz, E. J. Kelly, H. Berl and M. V. Wallace
ATTORNEYS April 7, 1970  D. W. REES  3,505,465
PANORAMIC TELEVISION VIEWING SYSTEM
Filed April 21, 1967  3 Sheets-Sheet 3

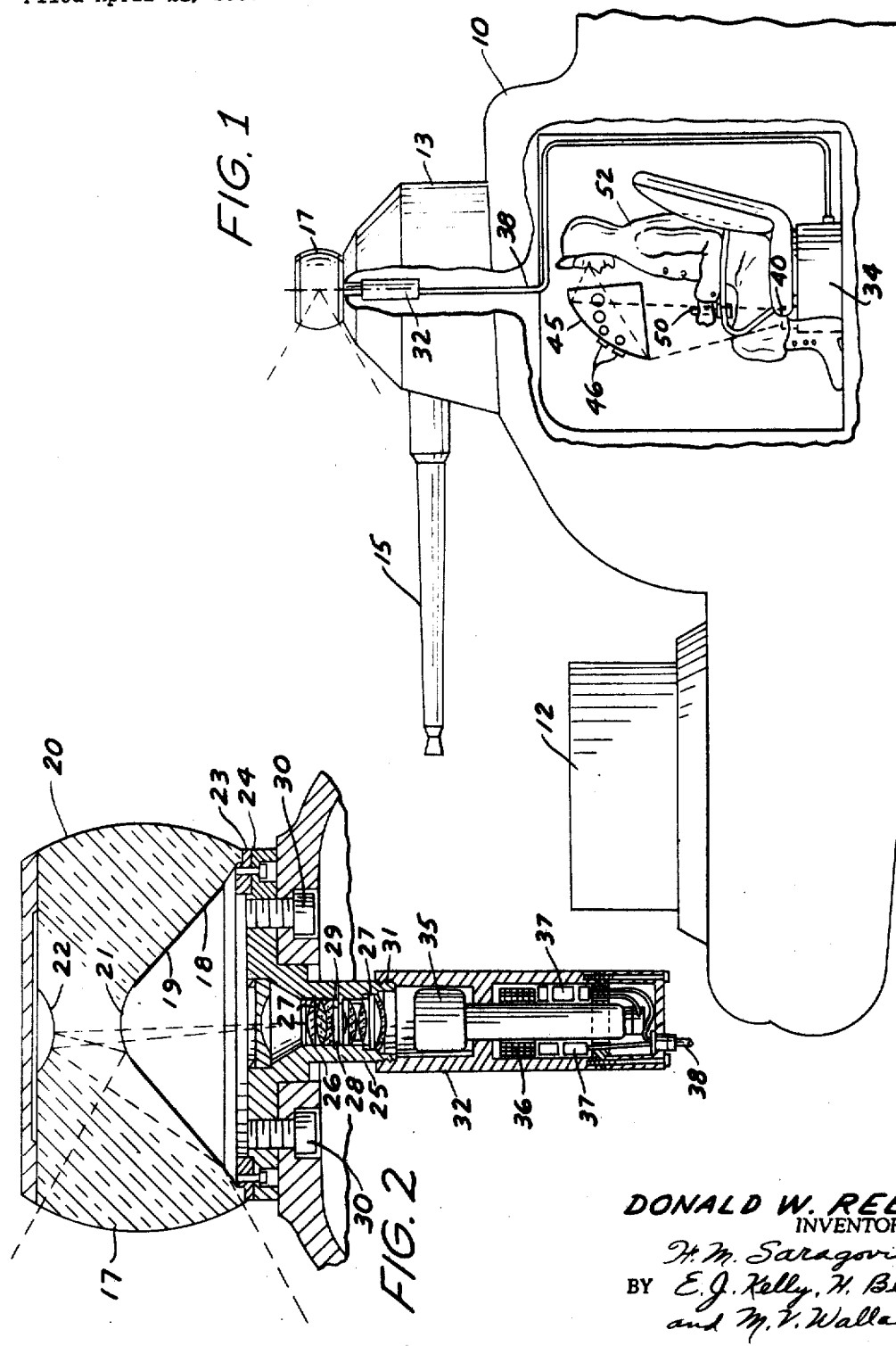

DONALD W. REES
INVENTOR.
BY H. M. Saragovitz
E. J. Kelly, H. Berl
and M. V. Wallace
ATTORNEYS

United States Patent Office 3,505,465
Patented Apr. 7, 1970

3,505,465
PANORAMIC TELEVISION VIEWING SYSTEM
Donald W. Rees, Warren, Mich., assignor to the United
States of America as represented by the Secretary of
the Army
Filed Apr. 21, 1967, Ser. No. 634,052
Int. Cl. H04n 5/74, 7/18
U.S. Cl. 178—6                                    7 Claims

ABSTRACT OF THE DISCLOSURE

A panoramic viewing device for use in vehicles utilizing hyperboloidal ellipsoidal reflecting optics and providing the vehicle operator with a 360° real time display of the area surrounding the vehicle wherein the operator and display may be located within the vehicle or at some remote point.

---

This invention relates in general to a panoramic viewing device and more particularly to a new and improved device for use in vehicles utilizing hyperboloidal ellipsoidal reflecting optics and providing the vehicle operator with a 360° real time display of the area surrounding the vehicle wherein the operator and display may be located within the vehicle or at some remote point.

When in combat armored vehicle driving and close order surveillance are presently achieved with the driver or commander positioned part way outside the protective armor of the vehicle, which viewing functions are performed with the unaided eye. Under conditions requiring total armor protection the driver and commander must withdraw into the vehicle and close all the access hatches. Viewing is then accomplished through vision blocks, vision periscopes and other optical devices located in the driver's and commander's compartments.

When a remotely controlled vehicle is in an area beyond the line of sight of the operator, it is necessary to provide the operator with a view of the area surrounding the vehicle. This is presently accomplished with a conventional television monitor at the operator's station. By viewing the monitor the operator is able to see a small part of the area surrounding the vehicle. If a larger viewing area is desired the camera may be fitted with a scanning device and/or a zoom lens.

In my Patent No. 3,229,576, issued Jan. 18, 1966, there is disclosed a panoramic viewing installation for use in vehicles utilizing hyperbolic ellipsoidal reflecting optics which provide the operator or observer with a 360° real time display. The present disclosure provides a further advance in this art incorporating a television camera and monitor to produce a new and improved viewing system.

Also, in the past, vision blocks, periscopes and other optical viewing systems in armored vehicles with onboard crew have provided only an extremely limited field of view. In systems up to and including the present the driver has had to be located at the front of the vehicle near the overhead access hatch so that the vehicle might be driven at times by direct view with the operator's head exposed. In most cases the exposed driver can observe only the terrain in front of the vehicle. Viewing with such limited field angles, both direct and indirect, reduces vehicle mobility and enables enemy personnel and vehicles to approach the vehicle undetected.

When operating a remotely controlled vehicle it is advantageous for the operator to be able to view as much of the area surrounding the vehicle as possible in order that he may readily turn corners or guide the vehicle through tight spaces. To provide the operator with this wide field of view, utilizing conventional television techniques, a short focal length wide angle lens system must be coupled to the camera. Such lens currently are capable of providing fields of view in excess of 180°. However, when the scene captured by such a wide field lens is displayed on a conventional monitor, serious distortion and angular displacement result. Since objects viewed on the screen tend to look farther away or smaller than actual size, the vehicle operator will at first have a tendency to overrun his objective. Upon discovery of this the operator will attempt to compensate. However, the compensation required is not constant and the operator has difficulty in applying the proper amount of compensation for any given situation.

It is therefore an object of the invention to provide an optical viewing system for vehicles which allows the vehicle operator a full 360° real time display and which eliminates the necessity of direct viewing.

A further object of the invention is to provide an optical panoramic viewing structure in vehicles which structure provides an increased field of view of the area outside the vehicle.

The above and other objects of the invention will appear more fully from the following more detailed description and from the drawings, wherein:

FIG. 1 is a diagrammatical sectional view of a closed pod vehicle showing the components of a panoramic viewing installation with the vehicle operator in position to drive the vehicle.

FIG. 2 is an enlarged vertical cross sectional view of the upper component of the viewing installation of FIG. 1.

FIG. 3 is an enlarged view of the lower components of FIG. 1.

FIG. 4 is a cross section of an alternate form of the viewing installation of FIG. 1.

Figure 5:
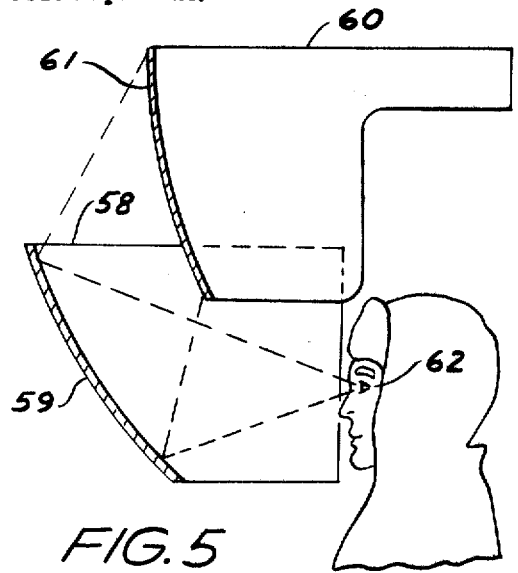
FIG. 5 is an alternate form of the viewing installation of FIG. 1.

Referring now to the drawings wherein like reference characters refer to like parts there is shown in FIG. 1, a closed pod tracked vehicle 10, such as a battle tank, which has a traversing main armament 12 and a cupola 13, which in turn supports a high rate of fire weapon 15. For viewing outside the vehicle there is secured to the upper portion of cupola 13, an image collector 17 of suitable protective material, such as glass or plastic, which is shown in detail in FIG. 2.

The collector 17 is formed by a reflecting surface or mirror 18, in the shape of a hyperboloid. The mirror is obtained by silvering or aluminizing the lower surface 19 of a support member 20. This surface forms a hyperbolic concavity 19 in support 20. The center of this surface, 21 is spheric in shape and is left uncoated. The surface 19 can be overcoated with a coating of suitable protective material, such as black acrylic paint. Support 20 is composed of a suitable transparent material, such as glass or plastic. Upper concavity 22 is a reflecting surface or mirror of spheric configuration and is formed by silvering or aluminizing the upper cavity 22 located in support 20. A circular inset 23, with a central circular portion removed, is securely bonded to the lower portion of support 20. Secured to the inset 23, by screw fastening devices 24, is a tubular lens holder 25. In holder 25 there are fixedly mounted a plurality of optically coupled lens elements 26, the same being mounted therein by means of holding rings 27. These elements interact to form a wide angle lens.

A diaphragm 28 is mounted in the lens holder 25, the same controlling the amount of light permitted through the wide angle lens.

A rotatable iris diaphragm control 29 is provided and can be manually controlled from the interior of the vehicle or automatically controlled by a transducer operator servo motor which operates the control 29 and thus varies the diameter of the iris diaphragm opening. The outer focus of the hyperbolic mirror 21 is made to coincide with the optical center of the wide angle lens 26. The lens holder 25 is secured to the cupola 13 by screw fastener 30.

Connected by threads 31 on the opposite end of lens holder 25, is a light amplifying device, the same comprising a special purpose television camera 32. The television camera 32 consists of an image orthicon tube 35 surrounded in part by a deflecting magnet 36 and the necessary electronic components 37. The camera 32 is connected to a remotely located television monitor 34 by means of a multiconductor cable 38, as shown best in FIGS. 1 and 3. The projection monitor consists of a large diameter wide angle projection lens 39 containing a plurality of lens elements 40; a first surfaced mirror 41, a high resolution, high brightness output kinescope tube 42; its defection magnet 43 and the necessary electronic components 44.

Although there is described a particular type of light amplification system, it is to be understood that this is for illustration only and that other types and modifications thereof can be used for this purpose.

The output of the television monitor 34 is projected into a viewing screen 45, FIG. 1. The viewing screen comprises an ellipsoidal section constructed of a suitable light weight material such as a clear plastic. The viewing surface of the screen consists of a light coating of lenticular material. The vehicle instruments 46 may be located behind the viewing screen where they may be viewed through the screen when required by lighting them. When not lighted the instruments will be invisible to the operator. The distortion introduced by the hyperboloidal image collector 19 is completely eliminated by the ellipsoidal screen 45 if the eccentricities of the screen ad collector are reciprocals.

A screen operated switch 50 allows the driver 52 to select the portion of the horizontal field he wishes to view. The switch 50 actuates a rotating device 53, FIG. 3, located on the projection kinescope deflection magnet 43, which in turn causes the picture to rotate to the scene segment desired.

Although the system herein described is for an armored vehicle with an on-board crew, the system may also be used on remotely operated vehicles. In this application the image collector and television camera are mounted in the remote vehicle while the projection monitor and viewing screen are at some distant point. The cable 38 connecting the camera 32 with the monitor 34 is then necessarily replaced by a video signal transmitter at the camera and a receiver at the monitor, not shown.

FIGS. 4 and 5 of the drawings disclose an alternate embodiment of the invention wherein the hyperbolic mirror 55 is inverted and viewed by television camera 56 through a lens system 57. The viewing surface of the screen 59 is specular or mirrored. A television kinescope tube 60 is superimposed above screen 58. The phosphor surface 61 of this tube is shaped and positioned so that it corresponds to the loci of the points of convergence of parallel rays projected onto the elliptical mirror surface from the area of the inner focus. This is also known as the focal surface of the mirror. The viewer is then placed at the inner focus 62 of the ellipsoidal mirror. The scene observed by the operator now appears to be at an infinite distance rather than on the surface of the ellipsoidal screen.

Figure 6:
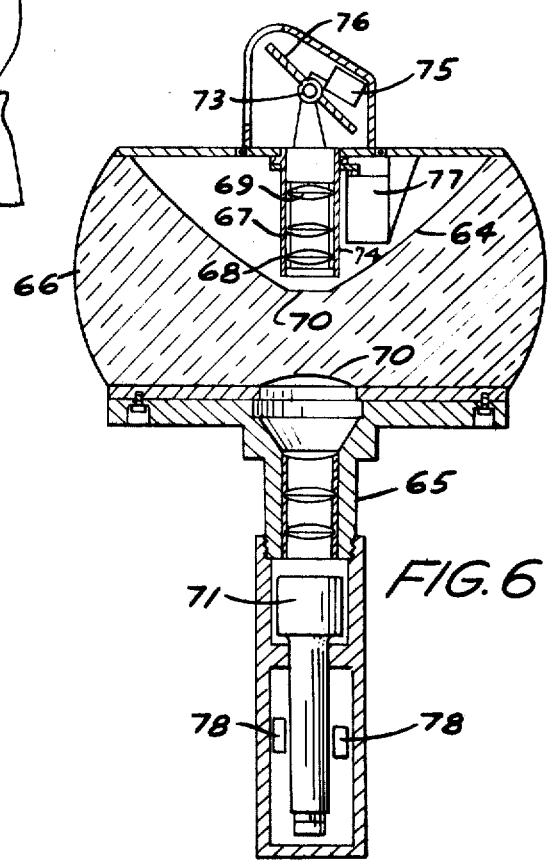
FIG. 6 is an enlarged cross section of an alternate form of the viewing installation.

In FIG. 6 is disclosed an auxiliary optical system which may be incorporated into a hyperbolic image forming unit as shown in FIGS. 4 and 5. This system allows magnification of the scene for long range observations. The hyperbolic image former 64, lens system 65, and support 66, are of similar configuration to those shown in previous embodiments disclosed herein. The plurality of lenses 67, 68, 69, form a telescope 74, and are so constructed as to cast a magnified image through interface 70 and lens system 65 onto photosensitive surface 71, of the television camera.

A bend in the optical path is accomplished by means of a mirror 76 which may be rotated about a pin 73 to provide depression and elevation to telescope 74. This is accomplished by a well-known small motor and gear train 75. Mirror 76 and lenses 67, 68, 69, may also be resolved about the center line or axis of the system by a motor and gear arrangement 77 whereby a complete 360° revolution would be possible.

If required the telescope 74 could be fitted with a reticle and synchronized to the movement of a gun laying device.

Figure 7:
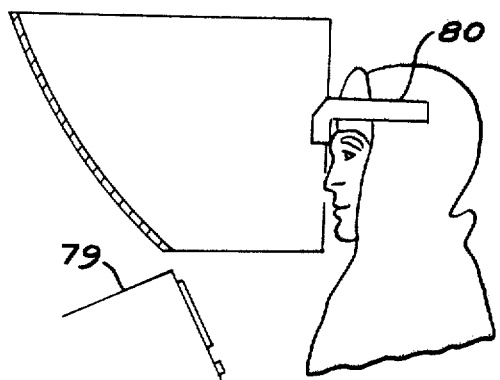
FIG. 7 shows the head-mounted monitor.

The image cast on photo-sensitive surface 71 covers only the central portion. This image is converted to a video signal by the photo-sensitive surface and associated television electronics 78. This video signal may then be sent to a conventional monitor mounted below the elliptical viewing screen 79 (FIG. 7) or may be displayed on a small head mounted monitor 80.

The manner in which the device operates is as follows:

The image of the scene surrounding the panoramic viewing device enters the system by way of the hyperbolic image collector 17 and impinges upon the collector mirror 19 creating a transformed or distorted image of the surrounding scene. Horizontal objects in the scene appear as curved images concentric about the mirror center, while vertical objects appear as images radiating from the mirror center. The transformed image is then reflected by spheric mirror 22 into the lens system 26 where it is shaped to conform to the input surface television camera image tube 35. The optical center of the lens system 26 is coincident with the outer focus of the mirror. The focus and depth field of the lens must be such that the image of the mirror appears in its entirely and in focus on the input surface on the television camera image tube 35.

The television camera tube 35 converts the scene image photons impinging on its photo surface to a series of voltages corresponding to the light intensity of each area of photosurface. This voltage which constitutes the video signal is amplified and sent through cable 38 to the television projection monitor 34, FIG. 3. Here the signal is used to modulate the electron beam in the monitor kinescope tube 42. This electron beam scans the phosphor on the kinescope face and reproduces several orders of magnitude brighter than the picture received at the television camera. The image on the face of the kinescope tube 42 is projected into the ellipsoidal viewing screen 45, FIG. 1, by the projection lens element 40, FIG. 3, and the first surface mirror 41. In order to produce an undistorted image on the viewing screen 45, lens 40 must have a angular field or view equal to that of the wide angle lens 26 connected to the hyperbolic mirror 19, FIG. 2. Lens 40 must also have a field curvature coincident with the surface of the viewing screen 45. The optical center or model point of the projection lens 40 must correspond with the outer focus of the ellipsoidal screen 45. The ellipsoidal screen is viewed from the area of the inner focus of the ellipsoidal screen. The image observed from this position is identical to that entering the system through the hyperbolic image collector.

In the alternate embodiments of the invention shown in FIGS. 4 and 5 of the drawings, the hyperbolic mirror 55 is inverted and viewed by the television camera 56 through lens system 57 without the aid of spheric mirror 22, FIG. 2. The elliptical viewing screen 58, FIG. 5, is also inverted.

The viewing surface of screen 59 FIG. 5, is specular or mirrored. A television kinescope tube 60 is then placed above screen 58. The phosphor surface 61 of the tube 60 is shaped and positioned so that it corresponds to the loci of the points of convergence of parallel rays projected onto the elliptical surface 58 from the area of the inner focus 62. This is also known as the focal surface of the mirror 59. The operator is then placed at the inner focus of the ellipsoidal screen 62. The scene observed by the operator now appears at an infinite distance rather than on the surface of ellipsoidal screen 59.

There are two primary advantages to the above embodiment. First—the scene viewed is more realistic to the viewer. Second—since the image appears at infinity rather than on the surface of screen 59, the size of screen 59 may be reduced without affecting the quality of the display.

This embodiment also provides an auxiliary optical system incorporated into the hyperbolic image forming unit and allows magnification of the scene for long range observations. The hyperbolic image former 64, FIG. 6; lens system 65 and support 66, are a similar configuration to those shown in previous embodiments. The plurality of lenses 67, 68, 69, form a telescope and are so constructed as to cast a magnified image through interfaces 70 and lens system 65 onto photo-sensitive surface 71. A bend in the optical path is accomplished by mirror 76. This mirror may be rotated about pin 73 to provide depression and elevation of the telescope 74, the same being accomplished by a small motor and gear train 75. Mirror 76 and lenses 67, 68, and 69 may also be revolved about the center line or axis of the system by a motor and gear arrangement 77. Complete 360° revolution would be possible. If required, the telescope 74 could be fitted with a reticle and synchronized to the movements of a gun, making it useful as a gun laying device. The image cast on photo-sensitive surface 71 covers only the central portion. This image is converted to a video signal by the photo-sensitive surface and associated television electronics 78. This video signal may then be sent to a conventional monitor mounted below the elliptical viewing screen 79, FIG. 7, or may be displayed on a small head mounted monitor 80.

There has been disclosed herein a new and improved optical viewing system which provides the viewer with a full 360° real time display and is thought to be a wider field of view than heretofore used. When used in connection with military armored vehicles the invention improves their ballistic and radiological protection capabilities by eliminating the need for viewing blocks and periscopes. It also eliminates the need for direct viewing and thereby protects the vehicle crew from direct body exposure to enemy fire. It also allows operator placement in any area of the vehicle hull convenient to vehicle design, and also allows the operator to view the area surrounding the vehicle from the highest point on the vehicle.

When the invention is used with remotely operated vehicles, this invention provides the remote vehicle operator with a 360° real time display of the area surrounding the vehicle. This wide angle of field is an increase over the field angle heretofore covered by conventional television systems. The system also provides 1—1 angular magnification in both horizontal and vertical planes.

It is also anticipated that the device could be readily adapted to naval vessels such as submarines or be mounted in a remote controlled vehicle.

Many modifications and variations of the present invention are possible in the light of the above teachings. It is therefore to be understood that within the scope of the appended claims; the invention may be practiced otherwise than as specifically described.

I claim:
1. A panoramic viewing system for producing a real time display, said system comprising,
   a hyperbolic image collector,
   a wide angle lens optically coupled to said collector,
   the optical center of said wide angle lens being coincident with the outer focus of said hyperbolic image collector,
   television camera means adapted to receive the image received in said image collector,
   a television projection monitor,
   means for transferring said image from said camera to said monitor,
   a concave viewing screen and means for transferring said image from said monitor to said concave viewing screen, wherein,
   said television projection monitor and viewing screen combination comprises,
   an elliptical viewing screen having a specular or mirrored surface,
   a television kinescope tube superimposed above said viewing screen,
   said television kinescope tube having a phosphor coated surface and positioned so that said phosphor coated surface corresponds to the loci of the points of convergence of parallel rays projected onto said elliptical viewing screen surface from the area of the focal surface of said viewing screen surface.

2. A panoramic viewing device as set forth in claim 1, wherein,
   said projection kinescope is equipped with a rotating device located on the projection kinescope deflection magnet which in turn permits picture rotation to the same segment desired.

3. A panoramic viewing system at set forth in claim 1, wherein,
   said image collector comprises a support means,
   a vertically and horizontally movable planar mirror mounted thereon,
   a telescope mounted below said planar mirror so mounted therein to cast a magnified version of the image received by said planar mirror to and through said lens transmission system to the photosensitive surface of said television camera means.

4. A panoramic viewing system as set forth in claim 1, wherein,
   said hyperbolic image collector and said support means mounted thereon have a spheric configuration concavity reflecting image collecting member mounted therein,
   said coated reflected member being of the shape of a hyperboloid, the center of same being spheric in shape and uncoated, disposed therein,
   said wide angle lens optically coupled and below said image collector are all in vertical alignment so that when an image enters said image collector the same impinges said coated reflector and is reflected by said spheric mirror in said support and thence through said uncoated portion of said hyperboloid through said wide angle lens to said television camera means, said optical system providing means for inverting said hyperboloid, thereby allowing the inversion of the elliptical viewing screen and projection kinescope monitor.

5. A paroramic viewing system as set forth in claim 1, wherein,
   said hyperbolic image collector comprises,
   a coated reflecting image collector member in the shape of a hyperboloid having a center portion spheric in shape and uncoated, disposed therein,
   a support member mounted on said image collector,
   a spheric configuration concavity reflecting member mounted on said support member,
   a transparent holding member, and a wide angle lens optically coupled to and below said coated reflecting image collector.

6. A panoramic viewing system as set forth in claim 1, wherein,
said television projection monitor comprises a wide angle projection lens containing a plurality of lens elements,
a high resolution, high brightness output kinescope tube,
and a surfaced mirror positioned so as to receive an image produced by said high resolution, high brightness output kinescope tube to reflect said image through said wide angle lens to produce up to 360° simultaneous horizontal field of view projection upon said viewing screen.

7. A panoramic viewing system as set forth in claim 1, wherein,
said concave viewing screen comprises a viewing surface of a light coating of lenticular material concentrates the light impinging upon the viewing surface thus providing a brighter apparent image to the viewer.

References Cited
UNITED STATES PATENTS

| | | | |
|---|---|---|---|
| 2,884,833 | 5/1959 | Pohl | 350—128 |
| 2,950,340 | 8/1960 | Compton. | |
| 3,205,303 | 9/1965 | Bradley. | |
| 3,229,576 | 1/1966 | Rees | 350—25 |

ROBERT L. GRIFFIN, Primary Examiner

H. W. BRITTON, Assistant Examiner

U.S. Cl. X.R.
350—25; 178—7.88